Patented Jan. 15, 1924.

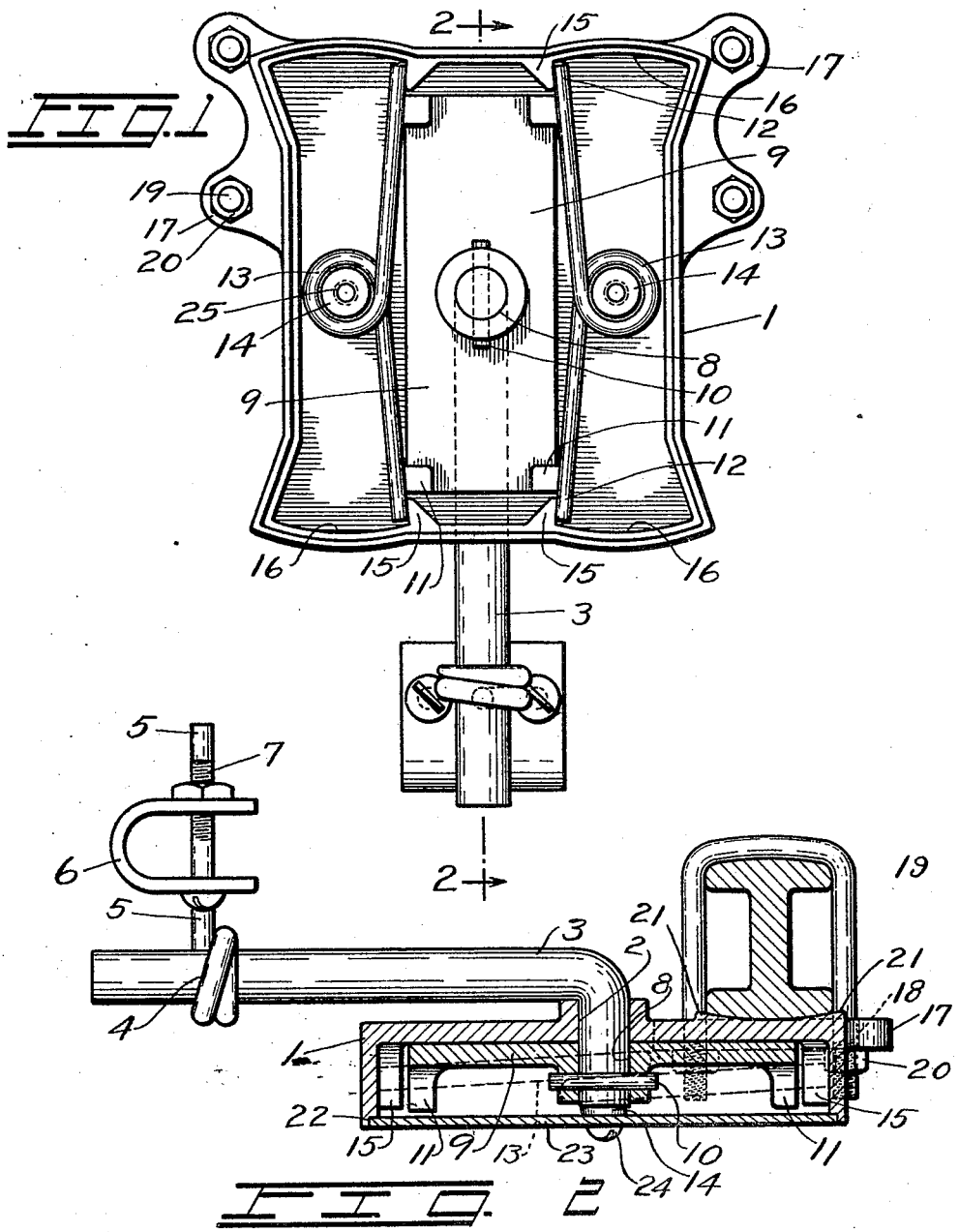

1,480,840

UNITED STATES PATENT OFFICE.

WILLIAM F. ROTERMUND, OF SEATTLE, WASHINGTON.

STEERING DEVICE.

Application filed December 12, 1921. Serial No. 521,909.

*To all whom it may concern:*

Be it known that I, WILLIAM F. ROTERMUND, a citizen of the United States, residing at Seattle, county of King, and State of Washington, have invented a new and useful Steering Device; and I do hereby declare that the following is a full, clear, and exact specification, such as will enable others skilled in the art to which it appertains to make and use the same.

The invention is a device for holding the front wheels of an automobile so that the car will travel straight ahead or for turning them to a straight ahead position if they are left at a small angle to either side.

The object of the invention is to construct a device with springs in it, which, when connected to the tie rod of an automobile will be so constructed that the springs will tighten if the front wheels are turned to either side so that the springs will tend to move the wheels back to a straight ahead position and hold them in this position.

Another object of the invention is to construct a device for stabilizing the steering gear of an automobile by the use of two springs mounted in a casing connected to the axle and tie rod.

And still another object of the invention is to construct a device for assisting a person steering an automobile to keep the front wheels straight ahead by constructing two springs in a casing in such a manner that each of them will act upon each end of a lever pivoted between them which lever may be connected to the tie rod.

With these ends in view, the invention embodies a casing with a lever, having a spring on each side of it and a rod connected to its center projecting thru the top of the casing, suitably mounted inside of the casing. On the outside of the casing are lugs thru which U bolts may be placed to hold the casing on an axle and on the bar projecting thru the casing may be placed a U clip and eye bolt for connecting it to the tie rod of an automobile.

Other features and advantages of the invention will appear from the following description taken in connection with the drawings, wherein—

Figure 1 is a view looking at the underside of the device with the cover plate removed.

Figure 2 is a cross section on line 2—2 of Figure 1.

In the drawings I have shown my device as it would be constructed wherein numeral 1 indicates the casing in the center of which is the hole 2 thru which the rod 3 projects. The outer end of the rod passes freely thru an eye 4 in the lower end of the bolt 5 which is held in holes in the outer end of the U clamp 6. The U clamp 6 slips over the tie rod of an automobile and is secured in place when the wheels of a car are in a straight ahead position by the bolts 7. The inner end of the rod 3 is bent at right angles and fits freely in the hole 2 in the top of the casing 1. The end of the rod projects into the hole 8 in the center of a plate 9 and is held in place by a pin 10. On each corner of the plate is a post 11 which projects downward and which bears against the ends 12 of the springs 13. These springs are held around posts 14 which project downward from the inner side of the casing and their ends 12 are prevented from moving further towards the center of the casing by the lugs 15 on the ends of the casing.

As the car turns to the right or left the tie rod will move laterally and pull the end of the lever 3 to one side or the other which will twist the plate 9 and cause the posts 11 on the opposite corners of the plate to push the ends 12 of the springs which bear against them outward. Recesses 16 are constructed in the ends of the casing 1 to permit the ends 12 of the spring to move outward. It will be seen that as one end of either of the springs moves outward the other end will remain in the position shown in Figure 1 as it will bear against the lugs 15 although the posts 11 will move away from it.

From two of the corners of the casing 1 and near the upper side of the casing lugs 17 project outward in which are holes 18 thru which the U bolts 19 are held by the nuts 20. These U bolts are put over the top of an axle and the casing 1 held up under the axle so that the U bolts will pass thru the holes 18 and then the nuts 20 are put on and tightened up to secure the casing to the bottom of the axle. On this part of the top of the casing are two lugs 21 which are beveled to fit the bottom of the axle.

In the lower edge of the casing 1 is a groove 22 in which the cover plate 23 is held by the screws 24 which screw into the holes 25 in the lugs 14.

It will be understood that changes may be made without departing from the spirit of the invention. One of which changes may be in the shape of the casing or in the placing of the cover on the top instead of on the bottom or in the design of the plate 9 or the connection between the rod 3 and the tie rod.

The construction will be readily understood from the foregoing description. To use the device it is bolted on the bottom of the front axle of an automobile and the U clamp placed over the tie rod as hereinbefore described. The eye bolt 5 is free to slide up and down in the holes in the U clamp 6 which allows for any difference in the distance between the tie rod and the bottom of the axle and allows for any upward or downward movement of the tie rod as it moves laterally. As the automobile is turned to the right or left the ends of the springs will be forced backward so that they will tend to return the wheels to the straight ahead position as hereinbefore described.

Having thus fully described the invention, what I claim as new and desire to secure by Letters Patent is:—

1. A steering attachment having a flat plate with a hub in its center, and lugs on each corner, and L-shaped arm with its short end held in the hub of the plate by a pin, and its long end being provided with a clamp for slidably attaching it to the tie rod of a vehicle; a suitable casing having a hole in it in which the short end of the L-shaped arm is pivotally mounted in such a manner that the plate will be on the inside of the casing and the long end of the arm will project on the outside, said casing being provided with lugs and U-bolts for attaching it to the front axle of a motor vehicle; and coil springs mounted upon round lugs in the casing and at each side of the flat plate, and said springs having extended ends that bear against the lugs on the flat plate.

2. A steering attachment having a rectangular shaped plate with a hub in the center and lugs on each corner, a bar bent in the shape of a right angle with one end held in the plate by a pin and the other extending parallel to the longitudinal axis of the plate, a clamp slidably attached to the outer end of the bar and being adaptable to be attached to the tie rod of a motor vehicle, a suitable casing having a hole in it through which the bar may pass so that the rectangular shaped plate may be on the inside of the casing, suitable means on the casing for attaching it to the front end of a motor vehicle, coil springs freely mounted on posts in the casing, and having extended ends which engage the lugs on the rectangular shaped plate, and lugs in the casing at the ends of the rectangular shaped plate against which the ends of the springs rest when the plate is in the neutral position, or when the plate is moved, so that the lugs will move in toward the center.

3. A steering attachment having a rectangular shaped plate with a hub in the center and lugs on each corner, a bar bent in the shape of a right angle with one end held in the plate by a pin and the other extending parallel to the longitudinal axis of the plate, a clamp slidably attached to the outer end of the bar and being adaptable to be attached to the tie rod of a motor vehicle, a suitable casing having a hole in it through which the bar may pass so that the rectangular shaped plate may be on the inside of the casing, suitable means on the casing for attaching it to the front end of a motor vehicle, a spring freely mounted on posts on each side of the rectangular shaped plate, the ends of which engage the lugs on the plate, and lugs in the casing at the ends of the rectangular shaped plate against which the ends of the springs rest when the plate is in the neutral position, or when the plate is moved, so that the lugs will move in toward the center.

WILLIAM F. ROTERMUND.